United States Patent [19]

Sawada

[11] Patent Number: 4,836,710

[45] Date of Patent: Jun. 6, 1989

[54] UNDERGROUND TANK WITH LEAK DETECTION MECHANISM

[75] Inventor: Koji Sawada, Tokyo, Japan

[73] Assignee: Nippon Engineer Service Kabushiki Kaisha, Tokyo, Japan

[21] Appl. No.: 91,036

[22] Filed: Aug. 31, 1987

[30] Foreign Application Priority Data

Feb. 10, 1987 [JP] Japan .................. 62-27099

[51] Int. Cl.$^4$ .............................................. B65G 5/00
[52] U.S. Cl. .......................................... 405/54; 73/49.2
[58] Field of Search ............................ 405/52, 53, 54; 73/49.2, 49.3; 220/18

[56] References Cited

U.S. PATENT DOCUMENTS 2,947,147 8/1960 Johnson .............................. 405/54
4,110,947 9/1978 Murray et al. .................... 405/54 X
4,639,164 1/1987 Pugnale et al. .................... 405/54

FOREIGN PATENT DOCUMENTS 1464612 2/1977 United Kingdom ................. 405/54

Primary Examiner—David H. Corbin
Attorney, Agent, or Firm—James E. Nilles; Thomas F. Kirby

[57] ABSTRACT

An underground tank having a leak detection mechanism, wherein a conduit is opened into a gap formed between an inner tank in which a fluid is to be contained and an outer tank covering the inner tank, a prescribed pressure of gas is applied to the gap through the conduit and the change in the pressure of gas in the conduit is detected by a detecting device, so that a leak of tank can be investigated. A thin sheet is wound on the outside surface of the inner tank so that the narrow gap is formed between the inner tank and the outer tank.

6 Claims, 1 Drawing Sheet

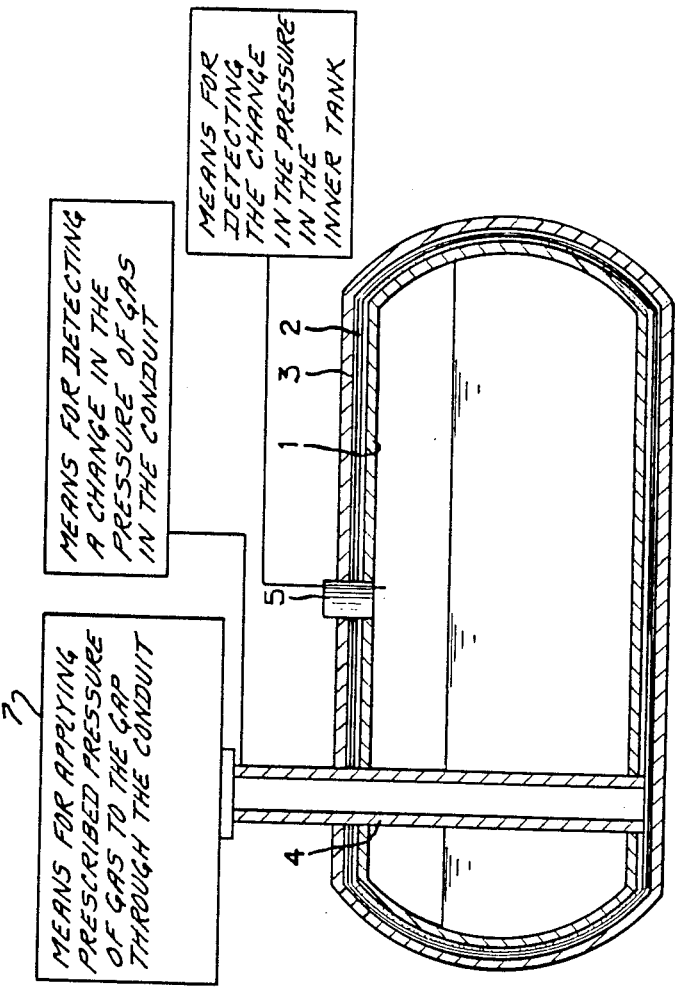
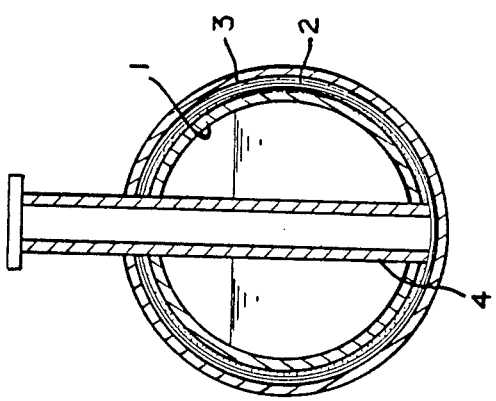
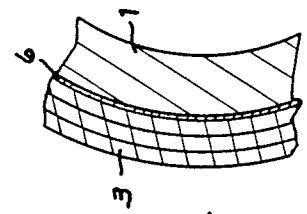

UNDERGROUND TANK WITH LEAK DETECTION MECHANISM

BACKGROUND OF THE INVENTION (Field of the Invention)

The present invention relates to an underground tank having a leak detection mechanism, and particularly relates to an underground tank having a mechanism for detecting the leak of a contained substance such as gasoline.

(Description of the Prior Art)

Since a conventional underground tank for oil such as gasoline at an oil handling facility such as a filling station is made of steel in accordance with the Fire Services Act, the underground tank is likely to corrode and the tank portion right under an oil pouring port is likely to be holed (eroded).

Even if the outside surface of the conventional underground tank is coated with a bituminous substance such as coal tar for rust prevention, the coating layer of the bituminous substance is dissolved by oil permeating through the ground from the surface thereof, so that the outside surface of the tank is likely to corrode.

SUMMARY OF THE INVENTION

It is an object of the present invention to provide an underground tank which can eliminate the abovementioned drawbacks of the conventional underground tank.

It is another object of the present invention to provide an underground tank having a leak detection mechanism and comprising an inner tank in which a fluid is to be contained; an outer tank covering said inner tank; a thin sheet wound on the outside surface of said inner tank so that a very narrow gap is defined between said inner tank and said outer tank; a conduit opened into the gap between said inner tank and said outer tank, a means for applying prescribed pressure of gas to said gap through said conduit, and a means for detecting the change in the pressure of gas in the conduit.

According to the present invention, the leak out of the underground tank can be easily and accurately detected by using a very small quantity of gas.

The other object and feature of the present invention are hereinafter described with reference to the drawings attached hereto.

BRIEF DESCRIPTION OF THE DRAWINGS

FIG. 1 shows a cross-sectional view of an underground tank having a leak detection mechanism of the present invention;

FIG. 2 shows a longitudinally sectional view of the underground tank shown in FIG. 1; and FIG. 3 shows an enlarged cross-sectional view of a portion of the tank of another embodiment of the present invention.

DESCRIPTION OF THE PREFERRED EMBODIMENT

FIGS. 1 and 2 show the embodiment of the present invention in which an inner cylindrical tank 1 made of steel and having an inside diameter of about 2 m, a length of about 6 m and a thickness of about 6 mm is covered with an outer tank 3 made of fiberglass-reinforced plastic and having a thickness of about 3 mm. A thin sheet 6, such as a reticulate polyvinylidene chloride sheet having a thickness of about 0.2 mm or the like is wound intermittently or densely around the outside surface of the inner tank 1, so that a gap 2 is defined between both the tanks. A steel conduit 4 having an outer diameter of about 80 mm and a thickness of about 6 mm extends down hermetically through the inner and the outer tanks 1 and 3 and is opened into the gap 2 formed between the interior surface 11 of the outer tank 3 and the outside surface 10 of the inner tank 1 at the bottoms of both the tanks. Gas pressure is applied to the gap 2 through the conduit 4 from a conventional source of gas pressure 7 through the conduit 4. A means for detecting the change in the pressure in the conduit 4 and a means for detecting the change in the pressure in the inner tank 1 are provided. A socket 5 having an oil pouring port, an air hole and so forth is provided on the upper portion of the inner tank 1 through the outer tanks 1 and 3.

A method of defining the gap 2 between the inner and the outer tanks 1 and 3 is that a plurality of projections each having a height of about 0.2 mm are provided on the outside surface of the inner tank 1, and the outer tank 3 split in two parts is then provided around the inner tank.

Another method of defining the gap 2 between the inner and the outer tanks 1 and 3 is that a polyvinylidene chloride sheet 6 having a thickness of about 0.2 mm and being reticulate or the like is intermittently or densely wound on the outside surface of the inner tank 1, a fiberglass fabric is densely wound on the sheet, and an unsaturated polyester is applied to the fiberglass fabric. In this method, the unsaturated polyester permeates into the fiberglass fabric so that they spontaneously harden to constitute the outer tank 3. The polyvinylidene chloride sheet has openings which have a thickness of about 0.2 mm and constitute the gap 2.

If a leak occurs in the inner tank 1, the gas in the conduit 4 and the gap 2 flows into the inner tank 1 so that the pressure of the gas in the conduit 4 drops. The leak in the inner tank 1 is detected by finding out the drop in the pressure of gas in the conduit 4.

The pressure in the gas in the conduit 4 drops at the time of a leak out of the outer tank 3 as well. If it is found out whether the pressure of the gas in the inner tank 1 goes up or not, it can be judged whether the leak has occurred out of the inner tank 1 or out of the outer tank 3.

What is claimed is:

1. An underground tank having a leak detection mechanism, comprising an inner tank having an outside surface and in which a fluid is to be contained; an outer tank having an interior surface and covering said inner tank; a thin sheet having holes therein wound on said outside surface of said inner tank and in contact with said interior surface of said outer tank so that a narrow gap is defined between said inner tank and said outer tank; a conduit opened into said gap between said inner tank and said outer tank; means for applying prescribed pressure of gas to said gap through said conduit; means for detecting a change in the pressure of gas in said conduit, and means for detecting a change in the pressure of gas in said inner tank.

2. The underground tank according to claim 1, wherein said thin sheet is a reticulate polyvinylidene chloride sheet having a thickness of about 0.2 mm.

3. The underground tank according to claim 1 or 2, wherein said outer tank comprises a fiberglass fabric wound on said thin sheet and hardened by an unsaturated polyester permeated into said fiberglass fabric.

4. The underground tank according to claim 1 or 2, wherein said thin sheet is in contact with substantially all of said interior surface of said outer tank so that said inner tank and thin sheet provides uniform support for said outer tank.

5. An underground tank having a leak detection mechanism, including an inner tank for containing a fluid and having an outside surface; an outer tank having an interior surface surrounding said inner tank in spaced relation thereto so that a narrow gap is defined between said inner tank and said outer tank; means to apply a prescribed pressure of gas to said gap; means for detecting the pressure of gas inn said gap; means for detecting a change in pressure of gas in said inner tank; and a thin sheet of material entirely filling said gap between said inner and outer tanks; said thin sheet being reticulated to have a network of openings for distributing said gas between said inner and outer tanks; and said thin sheet being on contact with substantially all of said outside surface of said inner tank and substantially all of said interior surface of said outer tank to provide uniform support for all of said exterior tank.

6. An underground tank according to claim 5 wherein said openings are about 0.2 mm.

* * * * *